(12) United States Patent
Kongable

(10) Patent No.: US 6,734,448 B2
(45) Date of Patent: May 11, 2004

(54) METHOD AND APPARATUS FOR BORESIGHTING A LASER WITH A FORWARD LOOKING INFRARED DEVICE

(75) Inventor: Albert W. Kongable, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 194 days.

(21) Appl. No.: 09/756,659

(22) Filed: Jan. 10, 2001

(65) Prior Publication Data

US 2003/0183784 A1 Oct. 2, 2003

(51) Int. Cl.$^7$ .................................................. F41J 2/00
(52) U.S. Cl. ........................... 250/504 R; 250/495.1; 250/330; 273/348; 273/1
(58) Field of Search ................. 250/504 R, 493.1, 250/495.1, 252.1, 330, 458.1; 273/348.1

(56) References Cited

U.S. PATENT DOCUMENTS

| | | | |
|---|---|---|---|
| 3,949,319 A | * | 4/1976 | Tofield et al. ............... 372/68 |
| 4,168,429 A | | 9/1979 | Lough |
| 4,302,678 A | | 11/1981 | Schiffert |
| 4,422,758 A | * | 12/1983 | Godfrey et al. ........... 356/152.1 |
| 4,649,274 A | | 3/1987 | Hartmann |
| 4,760,257 A | * | 7/1988 | Pollack et al. ............. 250/330 |
| 4,798,462 A | | 1/1989 | Byren |
| 5,047,638 A | | 9/1991 | Cameron et al. |
| 5,515,161 A | | 5/1996 | Blumenfeld |
| 5,577,733 A | * | 11/1996 | Downing |
| 5,672,872 A | | 9/1997 | Wu et al. |
| 5,689,110 A | | 11/1997 | Dietz et al. |
| 5,783,825 A | | 7/1998 | Wiese |
| 5,838,014 A | * | 11/1998 | Cabib et al. ............... 250/504 R |

OTHER PUBLICATIONS

"Radioactive and Multiphonon Relaxation of the Mid–IR Transitions of $Pr^{3+}$ in $LaCl_3$", L.B. Shaw et al., IEEE Journal of Quantum Electronics, vol. 32, No. 12, pp. 2166–2172, Dec. 1996.

L. B. Shaw et al., "Radiative and Multiphonon Relaxation of the Mid–IR Transitions of $Pr^{3+in\ LaCl_3}$", *IEEE Journal of Quantum Electronics*, vol. 32, No. 12, Dec. 1996, pp. 2166–2172.

M. C. Nostrand et al., "Spectroscopic data for infrared transitions in $CaGa_2S_iDy^{3+}$, Na", AMF4, pp. 167–169.

L. F. Johnson et al., "Laser emission at 3 $\mu$ from $Dy^{3+}$ in $BaY_2F_8$", *Applied Physics Letters*, vol. 23, No. 2, Jul. 15, 1973, pp. 96–98.

* cited by examiner

*Primary Examiner*—John R. Lee
*Assistant Examiner*—Christopher M. Kalivoda
(74) *Attorney, Agent, or Firm*—Burns, Doane, Swecker & Mathis, L.L.P.

(57) ABSTRACT

A system is provided for boresighting a laser to a passive sensor using a fluorescent conversion material. A passive sensor, such as a FLIR, is aligned with a boresight module using a test pattern on a fluorescent conversion material. Laser energy is then emitted onto the fluorescent conversion material at a first wavelength which is beyond the passive sensor's operating waveband. The fluorescent conversion material then radiates the laser energy at a second wavelength which is within the passive sensor's operating waveband. The location where the laser energy is radiated on the fluorescent conversion material is used as a reference in boresighting the laser to the passive sensor.

23 Claims, 3 Drawing Sheets

METHOD AND APPARATUS FOR BORESIGHTING A LASER WITH A FORWARD LOOKING INFRARED DEVICE

BACKGROUND OF THE INVENTION

1. Field of the Invention

The present invention relates to a boresighting apparatus and more particularly to a boresighting apparatus for boresighting a laser with a forward looking infrared device (FLIR) having a fluorescent conversion material.

2. Background Information

The use of both passive and active electro-optic sensors which employ lasers as an illumination source has become widespread in both the commercial and military markets. In military systems, for example, imaging infrared sensors have often been used for target acquisition, followed by a rapid and precise illumination of the target with a laser for measuring range to a target, designating the target for a laser guided bomb or for further information gathering. To achieve high precision, weapons must be accurately boresighted to (i.e., aligned with) sensors, using such a system as that described in U.S. Pat. No. 5,838,014, the disclosure of which is hereby incorporated by reference in its entirety.

However, conventional boresighting methods are susceptible to damaging problems which can hamper system performance. These methods generally fall into two categories: 1) having a dedicated laser detector in the boresight module or 2) using a thermal conversion material that absorbs the laser radiation, heats up, and then thermally emits radiation that can be detected by the passive sensor.

The first method is probably the most common and involves placing a detector in the boresight module that is mechanically aligned to the passive sensor boresight test pattern during assembly. This detector can be a single element detector, a multi-element detector such as a quadrant detector, or a position sensitive detector. In each case, a bias voltage is applied to each element, and readout/signal processing electronics must be provided. This additional electronics requirement increases the cost, size, and complexity of the boresight module and is an additional source for system failures. Use of a single element laser detector also involves the use of complex test pattern targets for location and alignment of the laser spot, further increasing the cost of the boresight module.

The second method of using thermal conversion materials to align Nd:YAG lasers (1.064 μm wavelength) to long-wave infrared (LWIR) sensors operating in the 7–14 μm waveband has always suffered from several problems. First, the thermal conversion materials usually do not provide a uniform spot for aligning the laser to the passive sensor. The laser power level and thermal conversion material heat sinking is closely matched so that heat is not conducted away too quickly for the alignment procedure to take place, but the heat cannot be allowed to build up to the extent that the thermal spot blurs and persists making boresight impossible. Another disadvantage is that the process of laser heating the thermal conversion material invariably causes damage to the material and therefore leads to a limited useful lifetime.

The ability to accurately align the pointing vectors of the laser and a passive sensor is important for the success of such a system. Accordingly, there is a need for a simple, inexpensive method of accurately boresighting a laser to a passive sensor (e.g., FLIR).

SUMMARY OF THE INVENTION

The present invention is directed to a system of boresighting a laser to a passive sensor using a fluorescent conversion material. Used in conjunction with a laser, such a material will not be damaged or result in a laser spot that grows in size with time. Also, problems associated with the mechanical alignment of a dedicated laser detector are avoided by the use of a fluorescent conversion material.

According to a first embodiment of the present invention, a boresighting system is provided comprising a laser emitting energy at a first wavelength, a boresight module having a fluorescent material, wherein the fluorescent material receives the emitted energy at a first wavelength and radiates the emitted energy at a second wavelength, and a sensor for detecting a location on the fluorescent material where the energy of a second wavelength is radiated.

According to a second embodiment of the present invention, a boresighting system is provided comprising means for emitting energy of a first wavelength, means for receiving the emitted energy, and means for identifying a location of the emitted energy on the receiving means using a fluorescent material to convert the energy of a first wavelength to energy of a second wavelength.

According to a third embodiment of the present invention, a method is provided for boresighting comprising the steps of aligning a sensor to a boresight module, emitting energy at a first wavelength from an energy source into the boresight module, absorbing energy at a first wavelength into a fluorescent conversion material located in the boresight module, radiating energy at a second wavelength from the fluorescent conversion material, detecting energy of the second wavelength at the sensor, and aligning the radiation source to the sensor based on the detected energy at the second wavelength.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

Exemplary boresight techniques described herein make use of the fluorescent properties of many materials to allow a passive sensor to directly detect the radiation from a laser transmitting a wavelength shorter than the short wavelength cutoff of the passive sensor. Exemplary embodiments use a solid state fluorescing material that absorbs the laser wavelength and radiates in the operating waveband of the passive sensor, while being transparent over a portion of the passive sensor's operating waveband.

Figure 3A:
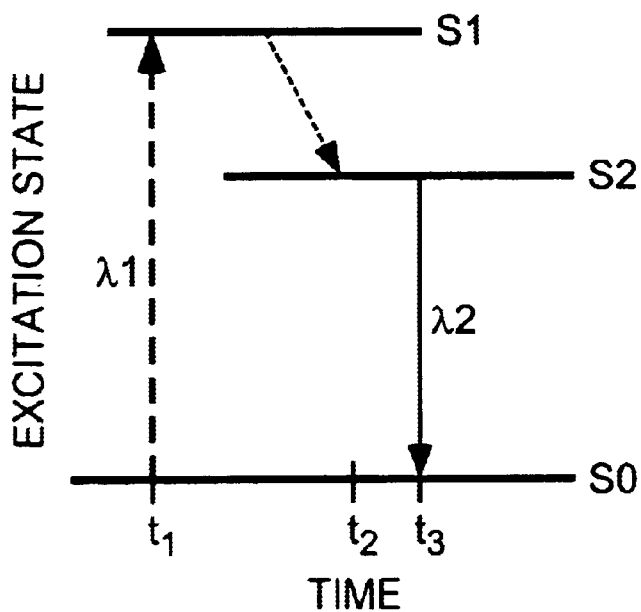
FIGS. 3a and 3b illustrate the process of fluorescence.
Figure 3B:
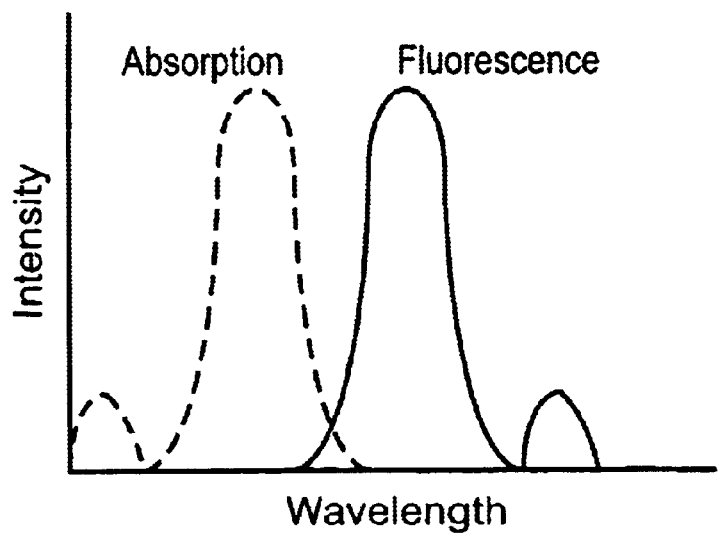

The term "fluorescence" can be better understood by reference to FIG. 3a, wherein at $t_1$ an ion or a molecule in the ground state $S_0$ absorbs an incident photon that falls within the characteristics absorption bands of that particular ion or molecule, and is elevated to an excited state $S_1$. At $t_2$, the excited ion/molecule relaxes, through vibrational or rotational interactions to a lower (less energy) excited state $S_2$ and then finally relaxes back to the ground (unexcited) state at $t_3$ through the emission of a photon of longer wavelength than the wavelength of the exciting photon. FIG. 3b illustrates the relationship between energy intensity and wavelength. Energy (i.e., a photon) of a shorter wavelength, as seen in FIG. 3b, is absorbed by an ion or a molecule but may not be "seen" by a passive sensor of a particular operating band (shown by the dotted line). Once the photon is emitted (as at $t_3$ in FIG. 3a), the wavelength is increased and the energy may be detected by the sensor.

In many molecular systems a second radiative decay path, through what is referred to as a "triplet state", is also available. When the radiative decay takes place through a triplet state, the process is referred to as phosphorescence. One of the main differences observed between fluorescence and phosphorescence is the relative time scale of the process. Fluorescence usually takes on the order of $10^{-9}$ to $10^{-4}$ (or lesser or greater) seconds to occur, while phosphorescence often takes between $10^{-2}$ and $10^2$ seconds (or lesser or greater). Phosphorescent materials could, in some cases, be used for the boresight material in accordance with exemplary embodiments, provided the longer decay times result in an acceptable increase of boresight times and an acceptable accuracy, which may be affected due to the "persistence" of the laser spot image.

Figure 1:
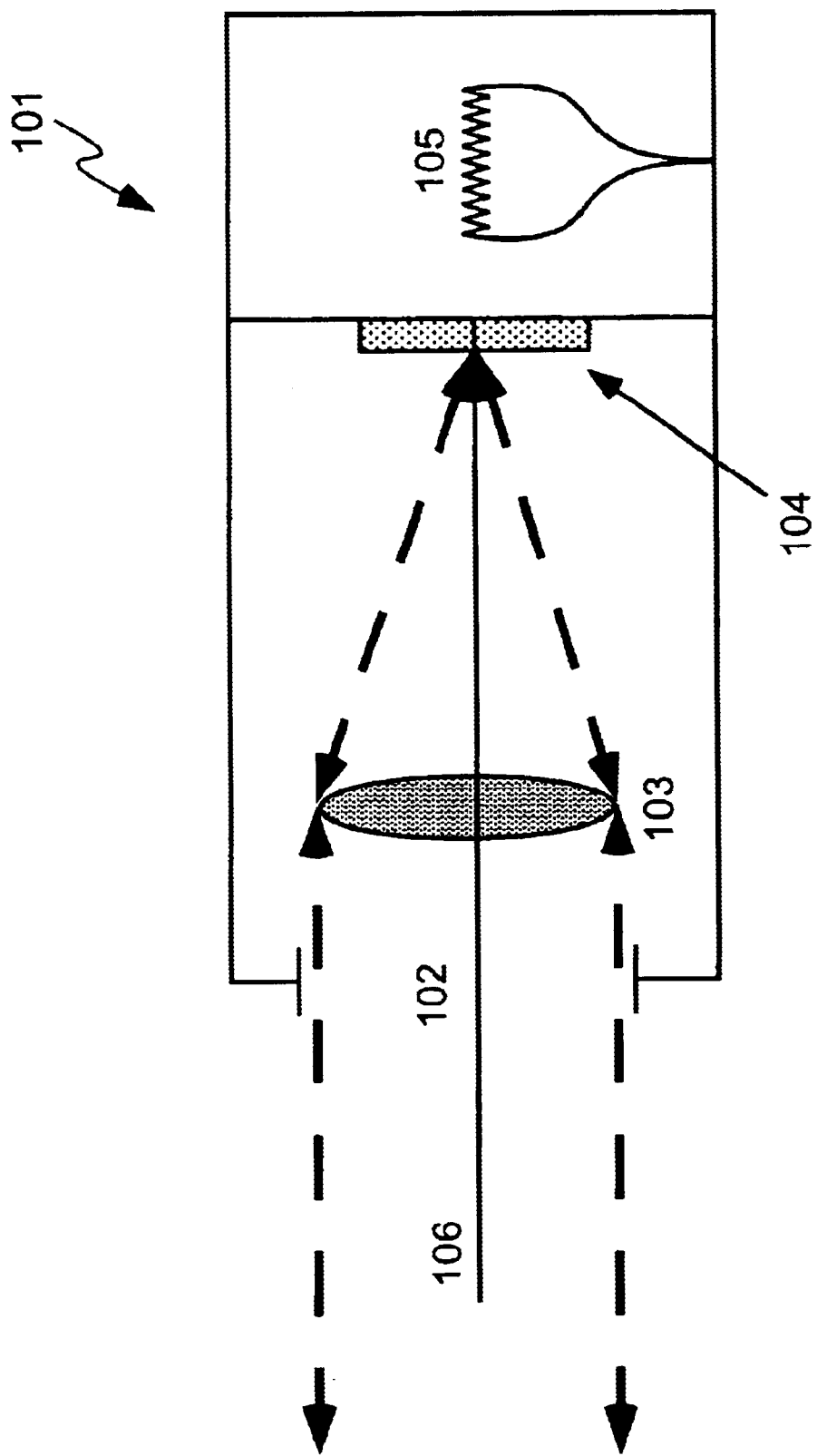
FIG. 1 illustrates a boresight module in accordance with an embodiment of the present invention.

Exemplary embodiments of the present invention have at least three elements: a means for emitting energy at a first wavelength (e.g., a laser), a means for receiving energy and for radiating energy at a second wavelength (e.g., fluorescent conversion material 104 shown in FIG. 1), and a means for determining a location of the energy of a second wavelength on the means for receiving (e.g., a sensor). As shown in FIG. 1, a boresight module 101 based upon fluorescence comprises an aperture 102, focusing optics 103, a fluorescent converter material 104, and a radiation source 105. Aperture 102 is a common aperture for a laser and a passive sensor, which are directed into the aperture 102 along a imaging sensor/laser path 106, and radiation source 105 is used for the initial passive sensor alignment. The only electrical interface necessary would be the power input to drive the radiation source.

Figure 2:
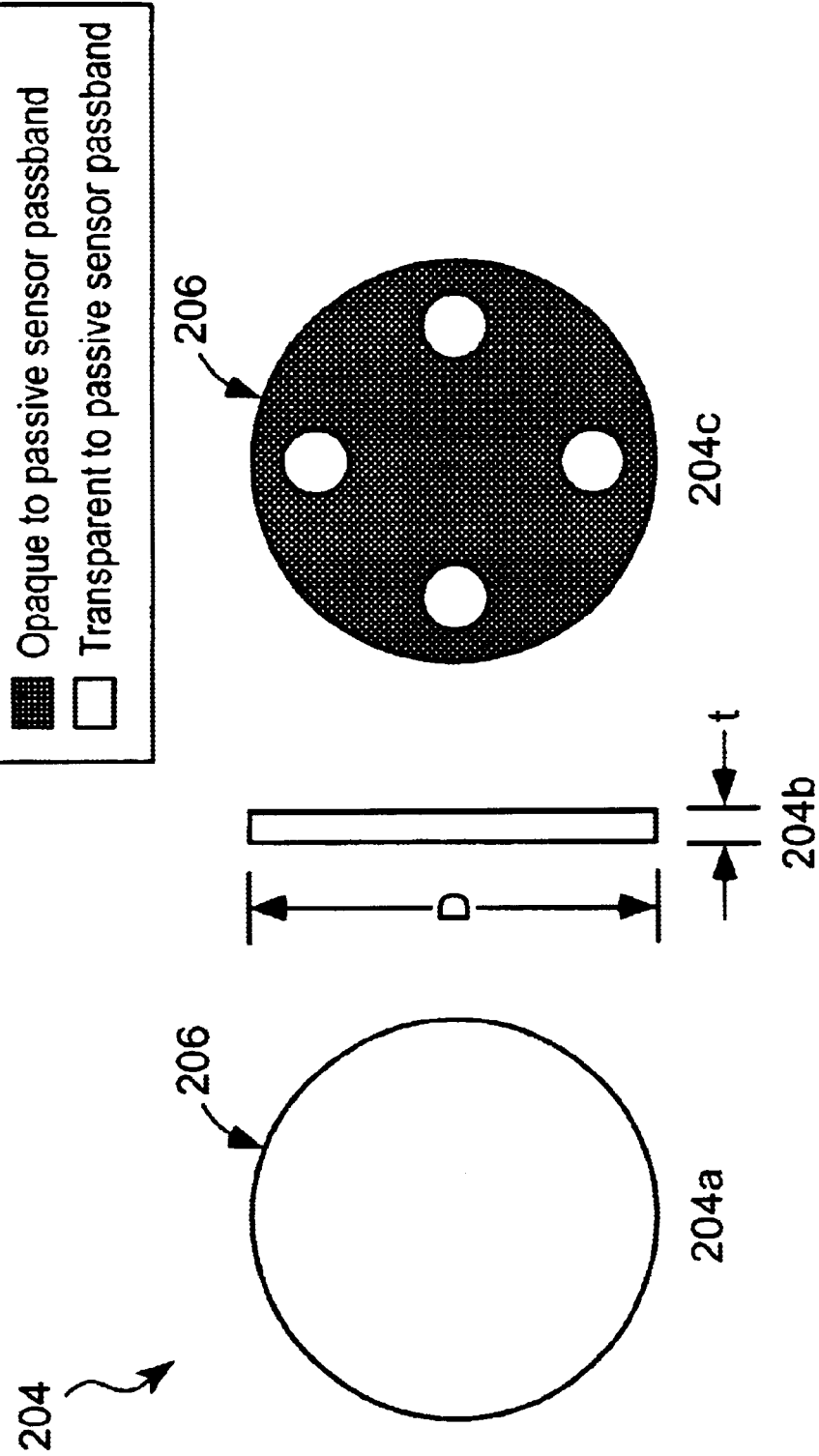
FIG. 2 illustrates a fluorescent conversion material in accordance with an embodiment of the present invention.

The fluorescent conversion material 104 is able to receive emitted energy at a first wavelength and to radiate the emitted energy at a second wavelength. Material 104 can be fabricated as a thin flat plate, which FIG. 2 shows in three views: front surface 204a, side surface 204b, and back surface 204c. The major surfaces 204a and 204c can be polished and anti-reflection coated for both the laser wavelength and the passive sensor waveband. The outer surface profile 206 is arbitrary, but can be made circular for convenience of manufacture and mounting, or can be of any other desired shape. The front surface 204a of the plate (nearest to aperture 102 of FIG. 1 and located at the focal plane of the focusing optics) can have a test pattern applied, with regions both opaque and transparent to radiation in the passive sensor's waveband. FIG. 2 shows one example of a fluorescent converter plate design of thickness "t" and diameter "D" with a simple test pattern applied. Of course, any test pattern can be used.

Any of numerous materials can be used for making fluorescent conversion material 104. Materials for rendering 1.064 μm radiation detectable to a mid-wave infrared (MWIR) sensor include, without limitation, the trivalent rare earth ions Dysprosium $(Dy^{3+})^{12}$, Praseodymium $(Pr^{3+})^3$, and Holmium $(Ho^{3+})$ doped into various hosts. These materials have shown absorption bands ranging from 0.8 to 1.5 μm, which cover the lasing wavelength of most diode lasers, laser rangefinders/designators, and eyesafe laser rangefinders. Fluorescent emission bands cover the MWIR FLIR band (3 to 5 μm) and extend as high as 7.2 μm, which cover the LWIR FLIR band.

Alternatively, fluorescent conversion material 104 can include laser dyes, which can provide very good conversion of short wavelengths to longer wavelengths. These dyes virtually cover the electromagnetic spectrum from UV out to about 1.2 μm and can be doped into either plastic host materials such as Plexiglas or into sol-gel type glasses to provide inexpensive fluorescent conversion materials.

According to an embodiment of the present invention, the boresight process is initiated by activating the radiation source 105 in boresight module 101 and by directing a passive sensor (not shown) into aperture 102. Alignment of the passive sensor, which is able to locate energy radiated from fluorescent conversion material 104, to boresight module 101 is performed in a conventional manner using the back illumination of the test pattern by radiation source 105.

Once the passive sensor is aligned to the test pattern of fluorescent conversion material 104, energy is emitted at a first wavelength from an energy source into boresight module 101. For example, a laser (not shown) can be fired into boresight module 101 through aperture 102. The energy at a first wavelength, which is outside the operating waveband of the sensor, is focused onto and absorbed by fluorescent conversion material 104. Energy at a second wavelength detectable by the sensor is radiated from fluorescent conversion material 104, and is detected by the sensor at a location on fluorescent conversion material 104 where the energy is incident. The radiation source is then aligned to the sensor based on the detected energy of a second wavelength. In other words, the location of the laser spot on fluorescent conversion material 104 can be determined relative to the center of a test pattern, for example, and the energy source can be subsequently aligned to the line-of-sight of the passive sensor.

Depending on the details of a particular system design, it may be advantageous to de-focus the laser spot on fluorescent conversion material 104 to provide a larger spot for tracking and centroiding, and/or to turn off radiation source 105 while aligning the laser to the passive sensor to increase system sensitivity.

An "acceptable/not acceptable" focus check for the laser can be accomplished by fabricating a hole or an opaque (at the laser wavelength) spot at the center of the test pattern, with the diameter of the hole or spot such that if the laser spot falls completely within it's perimeter (and thus disappears from the passive sensor's view) the laser path is adequately focused.

This method of fluorescent conversion boresighting can be useful for aligning an in-band laser to a passive sensor when the passive sensor has been optically "hardened" (e.g. with optical notch filters) to protect against damage or blinding from back scattered laser radiation or inadvertent illumination from common laser sources.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A boresighting system comprising:
   a laser emitting energy at a first wavelength;
   a boresight module having a fluorescent material, wherein the fluorescent material receives the emitted energy at a first wavelength and radiates the emitted energy at a second wavelength; and
   a sensor for detecting a location on the fluorescent material where the energy of a second wavelength is radiated,
   wherein the second wavelength is longer than the first wavelength.

2. The boresighting system of claim 1, wherein the fluorescent material comprises a test pattern.

3. A boresighting system comprising:
   means for emitting energy of a first wavelength;
   means for receiving the emitted energy; and
   means for determining a location of the emitted energy in the receiving means, using a fluorescent material to convert the energy of a first wavelength to energy of a second wavelength,
   wherein the second wavelength is longer than the first wavelength.

4. The boresighting system according to claim 3, wherein the fluorescent material is located in the means for receiving the emitted energy, and wherein the means for determining locates the emitted energy on the fluorescent material.

5. The boresighting system according to claim 4, wherein the fluorescent material is a host material doped with a trivalent rare earth ion.

6. The boresighting system according to claim 5, wherein the trivalent rare earth ion is Dysprosium, Praseodymium, or Holmium.

7. The boresighting system according to claim 4, wherein the fluorescent material is a host material doped with a laser dye.

8. The boresighting system according to claim 4, wherein the fluorescent material comprises a test pattern.

9. The boresighting system according to claim 3, wherein the means for emitting energy of a first wavelength is a laser.

10. The boresighting system according to claim 9, wherein the laser is a 1.064 micrometer wavelength Nd:YAG laser.

11. The boresighting system according to claim 3, wherein the means for receiving the emitted energy is a boresight module comprising focusing optics.

12. The boresighting system according to claim 3, wherein the means for determining is a forward looking infrared imaging system.

13. The boresighting system according to claim 12, wherein the forward looking infrared imaging system uses mid-wave infrared sensors.

14. The boresighting system according to claim 12, wherein the forward looking infrared imaging system uses long-wave infrared sensors.

15. A method for boresighting comprising the steps of:
    aligning a sensor to a boresight module;
    emitting energy at a first wavelength from an energy source into the boresight module;
    absorbing energy at a first wavelength into a fluorescent conversion material located in the boresight module;
    radiating energy at a second wavelength from the fluorescent conversion material, wherein the second wavelength is longer than the first wavelength;
    detecting energy of a second wavelength at the sensor; and
    aligning a radiation source to the sensor based on the detected energy of a second wavelength.

16. The method according to claim 15, wherein the step of detecting further comprises the step of locating on the fluorescent conversion material the location where the radiation of a second wavelength is emitted.

17. The method according to claim 15, wherein the first wavelength is outside the operating waveband of the sensor.

18. The boresighting system of claim 1, comprising a radiation source, the radiation source back illuminating the flourescent material to radiate energy at the second wavelength.

19. The boresighting system of claim 18, wherein the fluorescent material back illuminated by the radiation source radiates energy at the second wavelength in a test pattern.

20. The boresighting system of claim 19, wherein a coating on the flourescent material produces the test pattern, the coating having a first region opaque to a passive sensor passband and having a second region transparent to the passive sensor passband.

21. The boresighting system according to claim 3, comprising a radiation source, the radiation source back illuminating the flourescent material to radiate energy at the second wavelength.

22. The boresighting system according to claim 21, wherein the flourescent material back illuminated by the radiation source radiates energy at the second wavelength in a test pattern.

23. The boresighting system according to claim 22, wherein a coating on the flourescent material produces the test pattern, the coating having a first region opaque to a passive sensor passband and having a second region transparent to the passive sensor passband.

* * * * *